(12) United States Patent
Casasnovas et al.

(10) Patent No.: US 11,306,859 B2
(45) Date of Patent: Apr. 19, 2022

(54) INTERPHASE MIXING INHIBITORS FOR MINIMIZING MATERIAL MIXING IN A MATERIAL PROCESSING SYSTEM

(71) Applicant: Tropicana Products, Inc., Bradenton, FL (US)

(72) Inventors: Johnny Casasnovas, Barrington, IL (US); Gerald Olean Fountain, Wilmette, IL (US); Jeffrey D. Mathews, Naperville, IL (US)

(73) Assignee: Tropicana Products, Inc., Bradenton, FL (US)

( * ) Notice: Subject to any disclaimer, the term of this patent is extended or adjusted under 35 U.S.C. 154(b) by 205 days.

(21) Appl. No.: 16/573,564

(22) Filed: Sep. 17, 2019

(65) Prior Publication Data

US 2021/0080044 A1 Mar. 18, 2021

(51) Int. Cl.
*F16L 55/18* (2006.01)
*F16L 55/11* (2006.01)
*F16L 55/10* (2006.01)

(52) U.S. Cl.
CPC .......... *F16L 55/11* (2013.01); *F16L 55/1003* (2013.01)

(58) Field of Classification Search
CPC ......... F16L 55/11; F16L 55/1003; F16L 55/42
USPC ...................................... 138/97, 89
See application file for complete search history.

(56) References Cited

U.S. PATENT DOCUMENTS

| | | | | |
|---|---|---|---|---|
| 2,320,371 A | * | 6/1943 | Manning | F16L 55/1003 138/89 |
| 2,941,537 A | | 6/1960 | Watkins | |
| 3,108,012 A | * | 10/1963 | Arvelc | B05C 7/08 427/238 |
| 3,137,318 A | * | 6/1964 | Maneri | B05D 7/22 138/97 |
| 3,356,777 A | * | 12/1967 | Barrett | F16L 55/1645 264/36.17 |

(Continued)

FOREIGN PATENT DOCUMENTS

| DE | 19513104 | 10/1996 |
|---|---|---|
| EP | 1306140 | 5/2003 |

OTHER PUBLICATIONS

"Superhydrophobic Coating," 2008 R&D 100 Award Entry Form, Sandia National Laboratories.

(Continued)

*Primary Examiner* — James F Hook
(74) *Attorney, Agent, or Firm* — Barnes & Thornburg LLP; G. Peter Nichols

(57) ABSTRACT

A hydrophobic separating plug is used to separate and inhibit mixing between a first material and a second material. The plug may be formed of a hydrophobic material or may be formed of a plurality of pigs that are a solid or semi-solid material that may be hydrophobic or may have a hydrophobic or superhydrophobic surface. The plurality of pigs may be disposed within a hydrophobic fluid and the pigs may be neutrally buoyant in the hydrophobic fluid. The hydrophobic separating plug has dimensions sufficient to substantially fill the cross-section of pipe sections in which it is located and to define a leading edge and a trailing edge such that the leading edge is in contact with a first material and the trailing edge is in contact with a second material. Advantageously, mixing between the first material and the second material is inhibited by the plug.

14 Claims, 2 Drawing Sheets

(56) References Cited

U.S. PATENT DOCUMENTS

| | | | |
|---|---|---|---|
| 3,645,331 A * | 2/1972 | Maurer | E21B 10/61 |
| | | | 175/65 |
| 3,895,466 A * | 7/1975 | Melton | F16L 55/11 |
| | | | 29/890.14 |
| 3,938,912 A | 2/1976 | Sakamoto et al. | |
| 4,767,603 A | 8/1988 | Byrd et al. | |
| 4,797,239 A | 1/1989 | Cho | |
| 5,186,214 A * | 2/1993 | Savard | F16L 55/1116 |
| | | | 138/89 |
| 5,230,842 A * | 7/1993 | Munde | B08B 9/0553 |
| | | | 118/408 |
| 6,267,001 B1 * | 7/2001 | Duncan | F16K 13/04 |
| | | | 137/68.11 |
| 7,183,239 B2 | 2/2007 | Smith et al. | |
| 7,485,343 B1 | 2/2009 | Branson et al. | |
| 8,273,693 B2 | 9/2012 | Schwartz | |
| 8,741,158 B2 | 6/2014 | Aytug et al. | |
| 2013/0213512 A1 * | 8/2013 | Meinke | E21B 33/12 |
| | | | 138/89 |
| 2016/0001337 A1 | 1/2016 | Ervin | |
| 2018/0149301 A1 | 5/2018 | Aslam | |
| 2020/0030859 A1 * | 1/2020 | Bolen | B08B 9/0555 |

OTHER PUBLICATIONS

International Search Report dated Oct. 14, 2020, in PCT/US2020/038704.

Written Opinion dated Oct. 14, 2020, in PCT/US2020/038704.

* cited by examiner

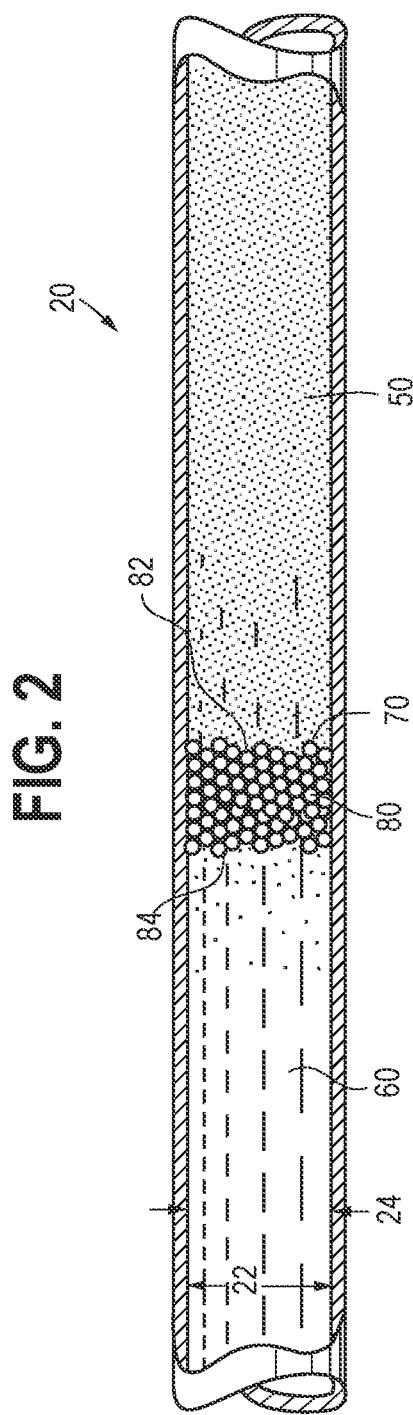

INTERPHASE MIXING INHIBITORS FOR MINIMIZING MATERIAL MIXING IN A MATERIAL PROCESSING SYSTEM

The present disclosure relates to inhibitors for separating fluids in material processing systems. The inhibitors may be in the form of hydrophobic separating plugs useful for separating aqueous-based or hydrophilic materials from each other, while minimizing mixing between the aqueous-based materials.

BACKGROUND

In material processing systems such as in food processing systems, there is a desire to improve processing yields and to decrease the time required to transition from a material currently being processed to a different material to be processed. These desires are particularly important when the material processing system is subject to frequent production changes. Further, there is a desire to minimize the environmental impact of waste streams related to blending of the materials during transitions.

Food manufacturers are being driven to improve processing yields through increasing pressure on costs and profitability, while addressing smaller batch sizes dictated by increased consumer variety with more frequent production changes.

Having advanced from artisan production methods, many types of food production now employ a high degree of automation, and so production of foods such as desserts, ready meals, condiments, dairy and juice products, and many others involve passing both ingredients and the finished product along a network of pipes during manufacturing before they reach the packing stations. Depending on the physical layout of the manufacturing site the routing of some of this pipework can be quite long, with several hundreds of meters not uncommon.

Further, in many situations, the piping system may include bends in the system, changes in the effective diameter of fluidly connected pipes, and the presence of equipment having multiple tubes or flow passages, such as heat exchangers or similar types of apparatuses.

At the end of a production batch, when the material processing system switches to another product or at the end of a production run prior to cleaning, the system will typically contain the material that was being processed, which typically holds a tangible financial value and an unwelcome cleaning (clean-in-place, CIP) challenge.

Recovering that material in most instances may be an economic or environmental desire. The unit cost of ingredients may be small; but if there are a thousand liters potentially lost in the system, and perhaps four or more product changes every day, the value of product to be recovered starts to appear as a significant cost. For a marginal product even a small cost saving and increase in yield has the potential to make a substantial impact on profitability.

Accordingly, there is a need for products and methods that can reduce the time between transitions of a first material and a second material as well as products and methods that minimize or inhibit mixing of the first material and the second material, which will have an impact on the amount of the first and second material lost to waste.

SUMMARY

According to one aspect of the disclosure, a hydrophobic separating plug is provided for use in, for example, material processing systems and in some instances systems used to process aqueous-based materials. Hydrophobic or hydrophobicity refers to a material that is seemingly repelled from a mass of water (strictly speaking, there is no repulsive force involved; it is an absence of attraction).

The hydrophobic plug may be a hydrophobic fluid such as a gas or liquid, a hydrophobic foam such as a polyurethane foam, or a hydrophobic emulsion such as a water-in-oil emulsion. In one embodiment, the hydrophobic plug includes a plurality of hydrophobic pigs. The hydrophobic pigs may be a solid or semi-solid material that may be hydrophobic such as, but not limited to, Teflon® (polytetrafluoroethene) beads, waxes, phtyosterols and the like. Alternatively or additionally, the hydrophobic pigs may be coated with a hydrophobic or superhydrophobic substance. Superhydrophobic substances are those that after application are such that the contact angles of a water droplet on the surface exceed 150°.

The plurality of hydrophobic pigs may be disposed within a hydrophobic fluid such as gas, bubbles, anti-bubbles, and oils such as edible oils. In some instances, the pigs may be neutrally buoyant in the hydrophobic fluid. Neutrally buoyant refers to a condition in which the average density of the hydrophobic pig is substantially equal to the density of the hydrophobic fluid in which the hydrophobic pig is immersed.

In some embodiments, the hydrophobic pigs may be compressible so that as the hydrophobic pigs pass through the flow passages, the hydrophobic pigs will be slightly compressed. In other embodiments, the hydrophobic pigs are fluid impermeable or fluid permeable.

Typically, a plurality of hydrophobic pigs are provided to define a hydrophobic plug that has dimensions sufficient to substantially fill the cross-section of the pipe sections in which the plug is disposed and to define a leading edge and a trailing edge of the plug such that the leading edge is in contact with a first material and the trailing edge is in contact with a second material.

The described hydrophobic plug is typically used in a piping system and is typically used in a piping system of a material processing system. A piping system refers to any duct, conduit, or pipe of varying lengths and widths in which the described hydrophobic plug can be formed. The hydrophobic plug is formed in a sealing relationship to the pipe and to the fluids on either side of it. The hydrophobic plug defines a leading edge and a trailing edge of the plug such that the leading edge is in contact with a first material and the trailing edge is in contact with a second material. The hydrophobic plug may itself form a segment of material moving through the pipe. Any convenient length may be used so long as there is enough of the hydrophobic plug to form a substantially sealing relationship (that is, to substantially prevent the mixing of the fluids it separates) with the pipe.

After the plug is defined, the plug is moved through the piping system by providing the second material in contact with the trailing edge of the plug. The second material is moved through the first pipe and any subsequent or downstream piping and/or manifolds, e.g., the second pipe, to push or move the hydrophobic plug through the piping system.

Advantageously, mixing of the first material and the second material is inhibited by the plug. In one embodiment, the plug is defined and configured such that mixing between the first material and the second material is inhibited or minimized. The inhibition of mixing is such that the amount of the first material present in the second material at the trailing edge of the plug is about 10% or less by volume or about 9%, 8%, 7%, 6%, 5%, 4%, 3%, 2% or about 1% by volume.

In some embodiments, the inhibition of mixing is such that the amount of the second material present in the first material at the leading edge of the plug is about 10% or less by volume or about 9%, 8%, 7%, 6%, 5%, 4%, 3%, 2% or about 1% by volume. In other embodiments, the inhibition of mixing is such that the amount of the first material present in the second material at the trailing edge of the plug is about 10% or less by volume or about 9%, 8%, 7%, 6%, 5%, 4%, 3%, 2% or about 1% by volume and the amount of the second material present in the first material at the leading edge of the plug is about 10% or less by volume or about 9%, 8%, 7%, 6%, 5%, 4%, 3%, 2% or about 1% by volume.

The disclosure also contemplates a method to inhibit or minimize mixing between a first material and a second material in a piping system. The piping system can be used for processing material or it may be used as a portion or subsystem of a plant or system for processing material. According to some described methods, the first material and the second material are aqueous-based materials that will be effectively separated by the described hydrophobic plug.

In one aspect, the piping system is used for processing food material. The food material may be solid, semi-solid, or liquid. In one embodiment, the piping system is used to process aqueous-based materials such as juice; for example, orange juice, grapefruit juice, lemon juice, apple juice and the like.

Material transitions may occur because of the need for periodic cleaning, because the system is required to process a different material than that currently being processed, or because of some other reason. In any event, the piping system may contain a first aqueous-based material and it is desired to remove the first aqueous-based material from the piping system and replace it with a second material. One of skill will appreciate that an exemplary transition may occur when the system is processing a first material and the piping system needs to be cleaned. In this instance, the second material may include a cleaning fluid, e.g., an aqueous-based cleaning fluid. To minimize the amount of the first material that is sent to waste, it would be desirable to minimize the amount of mixing between the first material and the second material, e.g., the cleaning fluid. At the same time, it would be desirable to provide a cleaning fluid at the greatest concentration practical without being diluted by the first material.

As noted above, the first material and/or the second material may be a solid, semi-solid, fluid (gas or liquid), slurry, powder, or any substance that can be conveyed. In addition, the second material may be a solid, semi-solid, fluid (gas or liquid), slurry, powder, or any substance that can be conveyed. In certain embodiments, the first material and the second material are hydrophilic materials. In some instances, the first material and the second material are the same type, e.g., both are liquids and both are aqueous-based liquids.

The piping system may have a number of connected pipes that may or may not include bends or other transitions from one end of the piping system to the other end. An example of a transition would be from a smaller diameter pipe to a larger diameter pipe and vice versa.

The piping system may include a first pipe with a first effective diameter and a second pipe fluidly connected with the first pipe and having a second effective diameter that may be the same as or different than the effective diameter of the first pipe.

As used in this application, the term "pipe" refers to a structure that is configured to convey substances that can flow-fluids (liquids and gases), slurries, powders or other substances that are sought to be conveyed. Also, the term "pipe" as used in this application includes open structures such as a trough as well as closed structures such as a cylindrical tube. It is contemplated that the term "pipe" refers to a structure having any shape suitable to convey substances that can flow.

As used in this application, "in fluid connection" or "fluidly connected" refers to pipes that are connected in a manner such that if a fluid was present in the pipes, the fluid is able to move through the pipes. One of skill will appreciate that if the material is a solid and it is moved through fluidly connected pipes, the solid would traverse the pipes forming the piping system.

The term "effective diameter" refers to a measure such that the area of a non-circular cross section pipe would be approximately the same as the area of a circular cross section pipe. One of skill will appreciate that the "effective diameter" is typically applicable in those instances where the pipe has a non-circular cross section. Further, one of skill will appreciate that, if the pipe has a circular cross section, the "effective diameter" is equal to the diameter of the pipe.

The piping system may also include portions that contain a plurality of flow passages. In some instances, those portions may be fluidly connected to an inlet manifold that is in fluid communication with a plurality of flow passages that terminate at an outlet manifold having a single outlet fluidly connected to other portions of the piping system. An example of such, would be a heat exchanger, pasteurizer, or membrane filtration system. The heat exchanger or pasteurizer may be a single pass, double pass, or multiple pass and may also be a straight-through design or a U-tube design, or some other type of design, such as plate and frame heat exchanger. One of skill would appreciate that one or more heat exchangers, pasteurizers, membrane filtration systems, or other pieces of processing equipment may be provided in the piping system.

As used in this application, the term "flow passage" or flow passages" refers to an arrangement of a plurality of structures that are configured to convey substances that can flow-fluids (liquids and gases), slurries, powders or other substances that are sought to be conveyed. Non-limiting examples of flow passages would be the tubes present in a shell and tube type exchanger, where a flow passage would be an individual tube of the shell and tube exchanger.

In one aspect, the first pipe includes a plurality of flow passages. In other aspect, the second pipe includes a plurality of flow passages. In yet another aspect, both the first pipe and the second pipe include a plurality of flow passages. Typically, each flow passage has substantially the same effective diameter. The effective diameter of each flow passage may be smaller than, substantially the same as, or larger than the first effective diameter and/or the second effective diameter. In one embodiment, the effective diameter of each flow passage is smaller than the first effective diameter and the second effective diameter.

Another aspect describes a method of separating two aqueous-based fluids for movement in a pipe that comprises placing between the two aqueous-based fluids in the pipe a hydrophobic separating plug. The hydrophobic separating plug may be used to separate portions or segments of aqueous-based fluids. For example, one segment may be a juice and the other an aqueous-based cleaning solution.

BRIEF DESCRIPTION OF THE DRAWINGS

The following description accompanies the drawings, all given by way of non-limiting examples that may be useful to understand how the described process and system may be embodied.

FIG. 2 is a schematic drawing showing a portion of a first pipe with a plurality of hydrophobic pigs sufficient to define a hydrophobic separating plug.

DESCRIPTION

Figure 1:
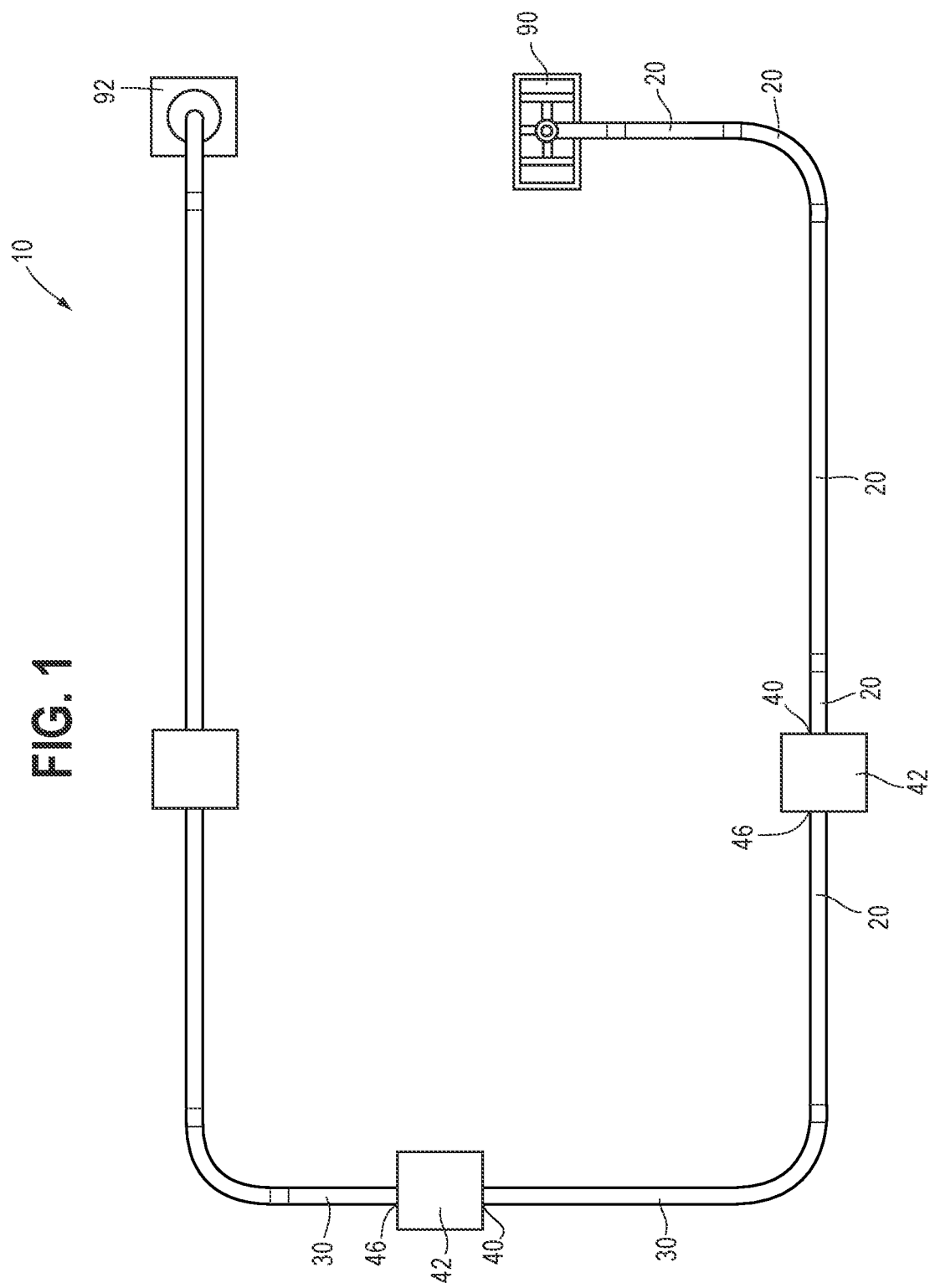
FIG. 1 is a top plan view of an exemplary piping system that is part of a material processing system and for which the method of this disclosure can be practiced.

The disclosure describes hydrophobic separating plugs that may be provided for use in, for example, material processing systems and in some instances systems used to process aqueous-based materials. Generally, material processing piping systems may be used for material processing and/or may form part of a system used for material processing. The elements or portions of the piping system are typically referred to as pipes, tubes, tube sections, or ducts in this description. The interior surface is referred to as a pipe wall or tube wall. The piping system may be used for a wide variety of materials including but not limited to solids, semi-solids, and liquids such as but not limited to food and non-food-related products such as edible and non-edible food products including meats, pastes, sauces, cereals, vegetables, fruits, dairy, cosmetics, pharmaceuticals and the like.

Generally, the material processing system may be used to process one or more differing types of products and therefore, the material processing system typically needs to be cleaned or flushed before a new material can be processed. The disclosed method advantageously accomplishes the transition between the material being processed and another material such as a cleaning material or another material to be processed while inhibiting the mixing between the materials. As a result, material and cost savings are realized.

Referring to FIG. 1, an exemplary schematic piping system 10 that can be used for material processing and/or that forms part of a system used for material processing is shown. The piping system 10 can be part of a food or beverage processing facility, a pharmaceutical plant, a chemical plant, or any known type of material processing plant. The piping system 10 is typically used within these facilities to convey product from one location to another. The piping system 10 includes a plurality of individual tube sections or pipes connected together to form a continuous conduit or piping system 10. For example, the piping system may include a plurality of first pipes or tube sections 20 and a plurality of second pipes or tube sections 30 with each of the first pipe sections 20 fluidly connected to each other, with first pipe sections 20 fluidly connected to second pipe sections 30, and with second pipe sections 30 being fluidly connected to each other. One of skill will appreciate that there may be other pipe sections fluidly connected to the second pipe sections 30 (and connected to each other).

The connections or methods of joining individual tube sections or pipes may include external compression clamps, compression couplings, sanitary flanges, or welded joints as well as other methods of joining tube sections. The arrangement of tube sections or pipes 20, 30 shown in FIG. 1 is exemplary and not limiting. The system and method of this disclosure may be used with a wide variety of system configurations including those that only include straight tube sections as well as those that include rises, falls, and turns. In addition, the system and method may be used with different turn radii, different numbers and different configurations of corners, different tubing materials, and different tube lengths.

Generally and in one embodiment, the piping system 10 is made with pipes or tube sections 20, 30 that are cylindrical; however, it is contemplated that the method can be used in piping systems where the pipes or tube sections 20, 30 are not cylindrical but have a shape other than cylindrical. In these instances, the pipes or tube sections 20, 30 may be considered to have an "effective diameter".

The term "effective diameter" refers to a measure such that the area of a non-circular cross section pipe would be approximately the same as the area of a circular cross section pipe. One of skill will appreciate that the "effective diameter" is typically applicable in those instances where the pipe has a non-circular cross section. Further, one of skill will appreciate that, if the pipe has a circular cross section, the "effective diameter" is equal to the diameter of the pipe.

The system and method may be used with pipes or tube sections having the same or different effective diameters. For example, the piping system may include a first pipe or tube section 20 having a first effective diameter 22 fluidly connected with second pipe or tube section 30 having a second effective diameter. In this instance, the second effective diameter may be smaller than, substantially the same as, the same as, or greater than the first effective diameter 22.

In some embodiments, the first pipe 20 and/or the second pipe 30 include a plurality of flow passages 42. For example, the first pipe 20 is fluidly connected to the inlet side 40 of the plurality of flow passages 42 and the outlet side 46 of the plurality of flow passages 42 are fluidly connected to the first pipe 20 or the second pipe 30. The flow passages 42 can be tubes in a heat exchanger, pasteurizer or similar type of processing apparatus such as a membrane filtration system, e.g., a ceramic membrane filtration system.

The piping system 10 has as least one inlet 90 where the hydrophobic plug 80 (described below) can be introduced into the system 10 and at least one outlet 92 where the plug 80 can be recovered. These locations can vary and can be at a vertical tube section, a horizontal section, or an angled tube section.

The inlet 90 may also be used to introduce the second material 60 and any other subsequent material.

Turning now to FIG. 2, a section of the piping system 10 is schematically shown. This section is typical of the first pipe 20 and the section contains a hydrophobic plug 80 formed from a plurality of hydrophobic pigs 70. The number of hydrophobic pigs 70 will be sufficient to fill or substantially fill the cross section of the pipe (e.g., the cross section 24 of the first pipe 20 or the cross section of the second pipe (not shown)) to define a plug 80. The number of hydrophobic pigs 70 provided will also be sufficient to extend an axial length to define a plug 80 having a leading edge 82 and a trailing edge 84. The leading edge 82 will be in contact with the first material 50 and the trailing edge 84 will be in contact with the second material 60. It will be appreciated that the leading edge 82 and the trailing edge 84 are not discrete defined boundaries; but rather as depicted in FIG. 2 can be considered to be the respective portions of the plug 80 where a column of pigs 70 extend from one side of the interior wall of the first pipe 20 or second pipe 30 to an opposite side of the interior wall of the respective first pipe 20 or second pipe 30.

It is also contemplated that the hydrophobic plug 80 may be provided by hydrophobic materials other than hydrophobic pigs. For example, the hydrophobic plug may be in the form of a gas, i.e., air, gas bubbles, anti-bubbles (a thin film of gas enclosing a liquid, e.g., a hydrophobic liquid), an oil or mixture of oils such as edible oils, foams such as polyurethane foams, emulsions such as water-in-oil emulsions, waxes, fats, grease, silicone materials such as trimethylsilanol, perflouroethers, fluorocarbon ether polymers of polyhexafluoropropylene oxide, with a chemical formula: $F-(CF(CF_3)-CF_2-O)_n-CF_2CF_3$, where the degree of polymerization, n, generally lies within the range of 10 to 60. These compounds are collectively known by many names including perfluoropolyether (PFPE), perfluoroalkylether (PFAE), perfluoropolyalkylether (PFPAE) and the like.

The defined plug 80 may have any suitable axial length but is typically sufficient to inhibit mixing of the first material 50 and the second material 60. The axial length will be such that the amount of the first material 50 present in the second material 60 at the trailing edge 84 is about 10% or less by volume. The axial length will be such that the amount of the second material 60 present in the first material 50 at the leading edge 82 is about 10% or less by volume. In some embodiments, the axial length is such that an amount of the first material 50 present in the second material 60 at the trailing edge 84 is about 10% or less by volume and such that an amount of the second material 60 present in the first material 50 at the leading edge 82 is about 10% or less by volume.

The hydrophobic pigs 70 may have any suitable shape although it is contemplated that the hydrophobic pigs 70 will be generally spherical so that when they agglomerate they will efficiently pack to form a plug 80 that will be effective to inhibit mixing of the first material 50 and the second material 60. Alternative shapes may include columnar shapes, bullet shape, and a shell-like shape, although as noted above, the pigs may have any particular shape so long as they can traverse the first pipe 20, the second pipe 30 and the flow passages 42.

The hydrophobic pigs 70 may typically have a size that is less than the effective diameter of the first pipe 20 or the second pipe 30. In other words, if the hydrophobic pigs 70 are spherical, they will have a diameter that is less than the effective diameter of the first pipe 20 or the second pipe 30. In addition, the hydrophobic pigs 70 may have a size that is smaller or slightly smaller than the effective diameter of the flow passages 42 (i.e., smaller or slightly smaller than the effective diameter of the tubes of the heat exchanger or pasteurizer). It is also contemplated that the hydrophobic pigs 70 may have a size that is substantially the same as or slightly larger than the effective diameter of the flow passages 42 (i.e., substantially the same as or slightly larger than the effective diameter of the tubes of the heat exchanger or pasteurizer).

It is also contemplated that each of the hydrophobic pigs 70 may or may not have the same size and shape. In this regard, it is desired to provide a size distribution of the hydrophobic pigs 70 that achieve a high packing density. To have high packing density, midsized pigs should be minimized by asymmetrically broadening fine to smaller fine and coarse to larger coarse pigs.

In some embodiments, the hydrophobic pigs 70 are compressible so that they are slightly compressed when travelling through the flow passages 42. The hydrophobic pigs 70 may have an elastic body that may be formed of elastically deformable materials such as rubber or rubber type polymers and the like or a flexible foam material such as polyurethane (food grade or otherwise). In other embodiments, the hydrophobic pigs 70 are incompressible.

The hydrophobic pigs 70 may be fluid impermeable or fluid permeable and, in use, the hydrophobic pigs 70 may be all fluid impermeable, all fluid permeable, or some combination of each.

The hydrophobic pigs 70 may be formed of hydrophobic materials such as silica aerogels, Teflon®, wax, phytosterols, steroids, and the like. Additionally, the hydrophobic pigs 70 may have a hydrophobic or superhydrophobic coating. When provided with a superhydrophobic coating, the contact angles of a water droplet on the surface of the hydrophobic pigs 70 exceed 150°.

It is also contemplated that the hydrophobic pigs may be formed from materials that are not hydrophobic but have a surface that is hydrophobic or superhydrophobic. Superhydrophobic surfaces may be provided to achieve the "lotus effect". Hydrophobic coatings are generally known and may include PTFE materials, waxes, steroids, phytosterols, oils, silanes, and the like. Superhydrophobic coatings and methods of forming superhydrophobic coatings are generally known and any suitable coating and method of forming superhydrophobic surfaces whether by providing such a surface physically (nano-structured) or chemically (providing a surface coating) are contemplated as being useful.

The hydrophobic pigs 70 may be dispersed within a hydrophobic fluid such as those described above in connection to the hydrophobic plug. For example, the hydrophobic fluid may be a gas, an oil, particularly an edible oil like a vegetable oil. Suitable vegetable oils may include, but are not limited to coconut, corn, cottonseed, olive, palm, palm kernel, peanut, rapeseed, soybean, and sunflower.

In some embodiments, some or all the hydrophobic pigs 70 may be made of a material such that the hydrophobic pigs 70 are neutrally buoyant in the fluid in which the hydrophobic pig 70 is immersed. For example, the hydrophobic pigs 70 may be neutrally buoyant in the hydrophobic fluid. Neutrally buoyant refers to a condition in which the average density of the hydrophobic pig 70 is substantially equal to the density of the hydrophobic fluid in which the hydrophobic pig 70 is immersed.

Without being bound by any particular theory, it is believed that by providing a hydrophobic separating plug 80 separating a first aqueous-based material from a second aqueous-based material, the repulsive (or non-attractive forces) between, on the one hand, the first and second aqueous-based materials and, on the other hand, the hydrophobic separating plug 80, will cause the plug 80 to be more densely packed with the result that mixing between the first and second aqueous-based materials is effectively inhibited.

Turning back to FIG. 1, a first plurality of hydrophobic pigs 70 are introduced or provided into the piping system 10 in an amount sufficient to substantially fill a cross section 24 of the first pipe 20 and to define a hydrophobic separating plug 80 having a leading edge 82 and a trailing edge 84, as depicted in FIG. 2.

After the plurality of hydrophobic pigs 70 are introduced or provided and a plug 80 is defined, the second material 60 is provided so that it is in contact with the trailing edge 84 of the plug 80. The second material 60 is moved to cause the plug 80 to move through the piping system 10. Because the second material 60 pushes the plug 80 through the piping system 10, the plug 80 is able to move the first material 50 through the piping system 10 so that the piping system 10 no longer contains the first material 50.

When the plug 80 encounters a change in the size of the pipe or a change in direction of the pipe, in those instances when the plug 80 is formed from a plurality of hydrophobic pigs 70, the plug 80 is able to traverse such changes because each of the hydrophobic pigs 70 has a size that is substantially the same as or smaller than the effective diameter of the pipe or flow passage they are traversing (or when each hydrophobic pig is larger than the effective diameter of the pipe or flow passage they are traversing, the hydrophobic pigs 70 will be compressible so that it can traverse the pipe and/or flow passage).

In some embodiments of the described method, it is contemplated to provide a second plug in the first pipe 20 subsequent to moving the first plug 80. The second plug will have a leading edge and a trailing edge such that the leading edge is in contact with the second material and the trailing edge is in contact with a third material. The third material may be the same as or different from the first material and/or the second material. The second plug is configured such that the amount of the second material present at the trailing edge of the second plug is about 10% or less by volume. In some embodiments, the second plug is configured such that the amount of the third material present at the leading edge of the second plug is about 10% or less by volume. In other embodiments, the second plug is configured is such that the amount of the second material present at the trailing edge of the second plug is about 10% or less by volume and the amount of the third material present at the leading edge of the second plug is about 10% or less by volume.

With the above in mind, the method may include providing a third, fourth, etc. hydrophobic separating plugs in the first pipe subsequent to providing a previous plug. Likewise, it is contemplated to provide a third, fourth, etc. material to move the respective third, fourth, etc. plug. In this regard, each material may be the same as or different than the first, second, or any previous material.

The first plug 80 and second plug (and each succeeding plug, when present) may be axially separated by a distance that could be as long as the axial distance of the piping system, but will typically be some fraction of that, such as about 75%, about 50%, about 40%, about 30%, about 20%, about 10%, about 9%, about 8%, about 7%, about 6%, about 5%, about 4%, about 3%, about 2%, or about 1%.

The first plug 80 and any subsequent plugs are moved through the piping system 10 until they reach an outlet 92 of the piping system 10 where they are collected.

While a method has been described that is effective in minimizing material mixing, it is contemplated that the method will be effective to clean the interior walls of the piping system and associated flow passages 42. In this regard, one of skill will appreciate that because the plug 80 fills or substantially fills the entire cross-section of the first pipe section 20 and the second pipe section 30 (when present), the surfaces of one or more hydrophobic pigs 70 will be in contact with the interior walls of the first pipe section 20 and the second pipe section 30 (when present). As a result, as the plug 80 is moved through the piping system 10, the interior walls of the first pipe section 20 and the second pipe section 30 (when present) will be "scrubbed" by one or more pigs 70, to effectively clean the interior surfaces of the first pipe section 20 and the second pipe section 30 (when present).

While the concepts of the present disclosure are susceptible to various modifications and alternative forms, specific exemplary embodiments of the disclosure have been shown by way of example in the drawings. It should be understood, however, that there is no intent to limit the concepts of the present disclosure to the particular disclosed forms; the intention is to cover all modifications, equivalents, and alternatives falling within the spirit and scope of the invention as defined by the claims.

The invention claimed is:

1. A method of minimizing mixing of a first aqueous-based material and a second aqueous-based material in a pipe having a first effective diameter, the method comprising:
providing a plurality of hydrophobic pigs formed of a solid or semi-solid material, each pig having a nominal size smaller than the first effective diameter, with the plurality of hydrophobic pigs being agglomerated and densely packed to define a hydrophobic separating plug between the first aqueous-based material and the second aqueous-based material in the piping system, wherein the plug has a leading edge, a trailing edge, and substantially fills a cross-section of the pipe such that the leading edge is in contact with the first material;
moving the plug through the pipe by moving the second material in contact with the trailing edge of the plug;
wherein mixing of the first aqueous-based material and the second aqueous-based material is inhibited by the hydrophobic separating plug.

2. The method of claim 1 wherein the solid or semi-solid material is formed from at least one of polytetrafluoroethene, wax, phytosterols, or steroids.

3. The method of claim 1 wherein the solid or semi-solid material has an outer surface comprising a hydrophobic or superhydrophobic material coating.

4. The method of claim 1 wherein the solid or semi-solid material is dispersed within a hydrophobic fluid.

5. The method of claim 4 wherein the solid or semi-solid material is neutrally buoyant in the hydrophobic fluid.

6. The method of claim 4 wherein the hydrophobic fluid is a gas.

7. The method of claim 4 wherein the hydrophobic fluid is an oil.

8. The method of claim 7 wherein the oil is an edible oil.

9. The method of claim 1 wherein the hydrophobic separating plug comprises gas, gas bubbles, anti-bubbles, oil, foam, emulsion, wax, fat, grease, trimethylsilanol, silicone materials, or fluorocarbon ether polymers.

10. The method of claim 1 wherein the hydrophobic separating plug comprises a plurality of anti-bubbles having an interior containing a hydrophobic material.

11. The method of claim 1 wherein the hydrophobic separating plug comprises a hydrophobic foam.

12. The method of claim 1 wherein the inhibition of the mixing is such that an amount of the first aqueous-based material present in the second aqueous-based material at a trailing edge of the hydrophobic separating plug is about 10% or less by volume.

13. The method of claim 12 wherein the inhibition of the mixing is such that an amount of the second aqueous-based material present in the first aqueous-based material at the leading edge of the hydrophobic separating plug is about 10% or less by volume.

14. The method of claim 1 wherein the inhibition of the mixing is such that an amount of the second aqueous-based material present in the first aqueous-based material at a leading edge of the hydrophobic separating plug is about 10% or less by volume.

* * * * *